United States Patent [19]

Belart et al.

[11] Patent Number: 4,743,075
[45] Date of Patent: May 10, 1988

[54] COMBINED TRACTION SLIP- AND SLIP-CONTROLLED BRAKE SYSTEM

[75] Inventors: Juan Belart, Walldorf; Wolfram Seibert, Darmstadt; Norbert Ocvirk, Offenbach, all of Fed. Rep. of Germany

[73] Assignee: Alfred Teves GmbH, Frankfurt am Main, Fed. Rep. of Germany

[21] Appl. No.: 42,599

[22] Filed: Apr. 21, 1987

Related U.S. Application Data

[63] Continuation of Ser. No. 783,552, Oct. 3, 1985, abandoned.

[30] Foreign Application Priority Data

Oct. 19, 1984 [DE] Fed. Rep. of Germany ....... 3438401

[51] Int. Cl.$^4$ ............................................. B60T 8/44
[52] U.S. Cl. .................................... 303/114; 180/197; 303/68; 303/119; 303/110
[58] Field of Search ................ 180/197; 303/113–119, 303/61–63, 68–69, 91, 92, 95, 100, 105, 110, 103, 111, 93; 188/181 A

[56] References Cited

U.S. PATENT DOCUMENTS

| 3,771,839 | 11/1973 | Fink | 303/119 X |
|---|---|---|---|
| 3,893,535 | 7/1975 | Burckhardt et al. | 180/197 |
| 4,206,950 | 6/1980 | Elliott | 303/119 X |
| 4,416,347 | 11/1983 | Bertling et al. | 303/110 X |
| 4,462,642 | 7/1984 | Leiber | 303/119 |
| 4,509,802 | 4/1985 | Solleder et al. | 303/110 |
| 4,565,411 | 1/1986 | Seiber | 303/110 |
| 4,583,611 | 4/1986 | Frank et al. | 180/197 |
| 4,592,599 | 6/1986 | Belart | 303/119 |
| 4,626,043 | 12/1986 | Belart et al. | 303/114 |
| 4,627,669 | 12/1986 | Belart et al. | 303/114 |
| 4,641,895 | 2/1987 | Belart et al. | 303/119 |
| 4,643,485 | 2/1987 | Leiber | 180/197 X |

FOREIGN PATENT DOCUMENTS

| 2649106 | 5/1977 | Fed. Rep. of Germany . |
|---|---|---|
| 3021116 | 12/1981 | Fed. Rep. of Germany . |
| 3215739 | 11/1983 | Fed. Rep. of Germany . |
| 2129517 | 5/1984 | United Kingdom ............ 303/114 |
| 2155129 | 9/1985 | United Kingdom . |
| 2165905 | 4/1986 | United Kingdom ............ 303/119 |

Primary Examiner—Douglas C. Butler
Attorney, Agent, or Firm—James B. Raden; Robert P. Seitter

[57] ABSTRACT

A combination traction slip- and brake slip-controlled brake system comprises a brake pressure generator (1) with an auxiliary energy supply system (2) and a pressure compensating reservoir (3) and electromagnetically actuatable valves (4–11) in the pressure fluid supply conduit to the wheel brakes (34–37) and in the return conduit (28, 28', 28'') to the pressure compensating reservoir (3). In addition, a valve arrangement (13, 29, 30, 31) is provided and through which pressure from the auxiliary energy supply system (2) can be introduced the pressure fluid return conduit (28, 28', 28'') and by way of outlet valves (8, 9) into the wheel brakes (34–37) of the driven vehicle wheels, with the purpose of controlling the traction slip.

3 Claims, 3 Drawing Sheets

COMBINED TRACTION SLIP- AND SLIP-CONTROLLED BRAKE SYSTEM This application is a continuation of application Ser. No. 783,552, filed Oct. 3, 1985, now abandoned.

BACKGROUND OF THE INVENTION

The present invention relates to a combined traction slip- and brake slip-controlled brake system for motor vehicles comprising a brake pressure generator with an auxiliary energy supply system and a pressure compensating reservoir. An electronic measuring and control circuit determines the wheel rotation behavior and generates electrical brake pressure control signals which are adapted to be fed to electromagnetically actuatable inlet and outlet valves incorporated in the pressure fluid supply conduit to the wheel brakes and in the pressure fluid return conduit from the wheel brakes to the pressure compensating reservoir. A value arrangement is provided and by means of which pressure fluid from the auxiliary energy supply system is introduceable into the wheel brakes of the driven wheels for the purpose of controlling the traction slip.

Brake systems with slip control are known. In order to prevent a locking of the wheels due to excessive brake pressure and to avoid the dangers connected therewith, particularly the risk of skidding and the loss of steerability, the brake pressure at the controlled wheel is either reduced or held constant in the event of a wheel becoming unstable and/or a wheel-lock tendency becoming apparent. The brake pressure is increased again, if need be, after the reacceleration of the wheel. These systems have, however, no influence on the wheel-spin due to excessive drive torque.

It has also been suggested to embody and supplement brake systems of the present type such that they can also limit the traction slip. For that purpose, the slip-controlled hydraulic brake system described in German printed and patent application No. P 33 27 401.0 has been equipped with a switch valve through the intermediary of which brake pressure from an auxiliary pressure source provided for brake power boosting can be introduced directly into the wheel brake of the drive wheel having a tendency to spin the moment the traction slip gets too high. By means of this normally closed switch valve, which is only switched into its open position during the traction slip control phase and up to the point where the necessary brake pressure is reached, the brake pressure generator at the outlet of which no brake pressure is available during this control phase in which the brake is not actuated traction slip is circumvented.

According to another proposition described in German printed and published application No. P 33 38 826.1, a pedal-actuated hydraulic brake pressure generator equipped with a master cylinder is provided, and pressure is introduced from an auxiliary pressure source provided for brake and power boosting directly into the master cylinder. In this construction, the pressure is transmitted (for example, by way of multiple-way valves) to a pre-chamber and non-return valves in the cups of the master cylinder pistons, into the working chambers of the master cylinder and from there to the wheel cylinders of the driven wheels by way of the inlet valves required for the brake slip control which are normally switched so as to be open.

It is an object of the present invention to develop a brake system which is suitable to control both the brake slip and the traction slip and which is characterized by a particularly simple construction. The system can be realized by means of a slight addition to a brake slip control system requiring only minor additional expense.

SUMMARY OF THE INVENTION

The objects of this invention are achieved by an improvement of a brake system of the aforementioned type, the particularity of which consists in that the value arrangement of the control of the traction slip is interposed in the pressure fluid conduits from the wheel brakes to the pressure compensation reservoir, i.e. between the outlet valves and the pressure compensating reservoir, and is controllable such that at least the pressure fluid return conduit and/or the outlet valves of the driven wheels are hydraulically connected to the pressure compensating reservoir during a brake slip control phase but to the auxiliary energy supply system during the traction slip control phase.

According to a preferred embodiment of the invention, the valve arrangement is shaped in the form of a three-way/two-position valve which, in the inoperative position, connects a common pressure fluid return conduit, attached to which are the outlet valves of the driven wheels or of all wheels, to the pressure compensating reservoir and, after having been switched over, to the auxiliary energy supply system. Instead of the three-way/two-position valve, two two-way/two-position valves may be used, namely a valve which is switched so as to be open in the inoperative position and connects the outlet valves of the driven wheels to the pressure compensating reservoir, and closed when activated and a second valve which is closed in the inoperative position and is open and connects the outlet valves to the auxiliary energy supply system after having been switched over.

According to another embodiment of the invention, the valve arrangement is formed by means of a three-way/two-position valve which, in the inoperative position, connects a common pressure fluid return conduit, attached to which are the outlet valves associated with the driven wheels, to the auxiliary energy supply system and, after having been switched over, to the pressure compensating reservoir. Instead of this latter three-way/two-position valve, two correspondingly arranged and hydraulically switched two-way/two-position valves can be used as well. These valves must be switched over during a brake slip control phase or at least during the brake pressure reduction.

The multiple-way valves provided in the brake system according to the invention can be either electromagnetically or hydraulically actuatable. In the latter case, the change-over pressure for the three-way/two position valve of the valve arrangement or for two corresponding two-way/two-position valves can be easily derived by means of a hydraulic connection to a chamber of the brake pressure generator, in which chamber a pressure is built up when the brake slip control sets in. In this embodiment of the invention, the additional expense (as compared to a brake system which is only suitable for brake slip control) therefore merely consists in one or two hydraulic multiple-way valves of very simple design and in an addition to a change of the electronic controller circuitry which must switch over the inlet and outlet valves at the driven vehicle wheels during the traction slip control phase in a specific way. In this manner the brake pressure from the auxiliary energy supply system can be introduced directly into the wheel cylinders of the driven wheels by way of the valve arrangement.

BRIEF DESCRIPTION OF THE DRAWING

Other features, advantages and applications of the present invention will become apparent from the following description of embodiments when taken in connection with the accompanying drawing wherein.

DETAILED DESCRIPTION

Figure 1:
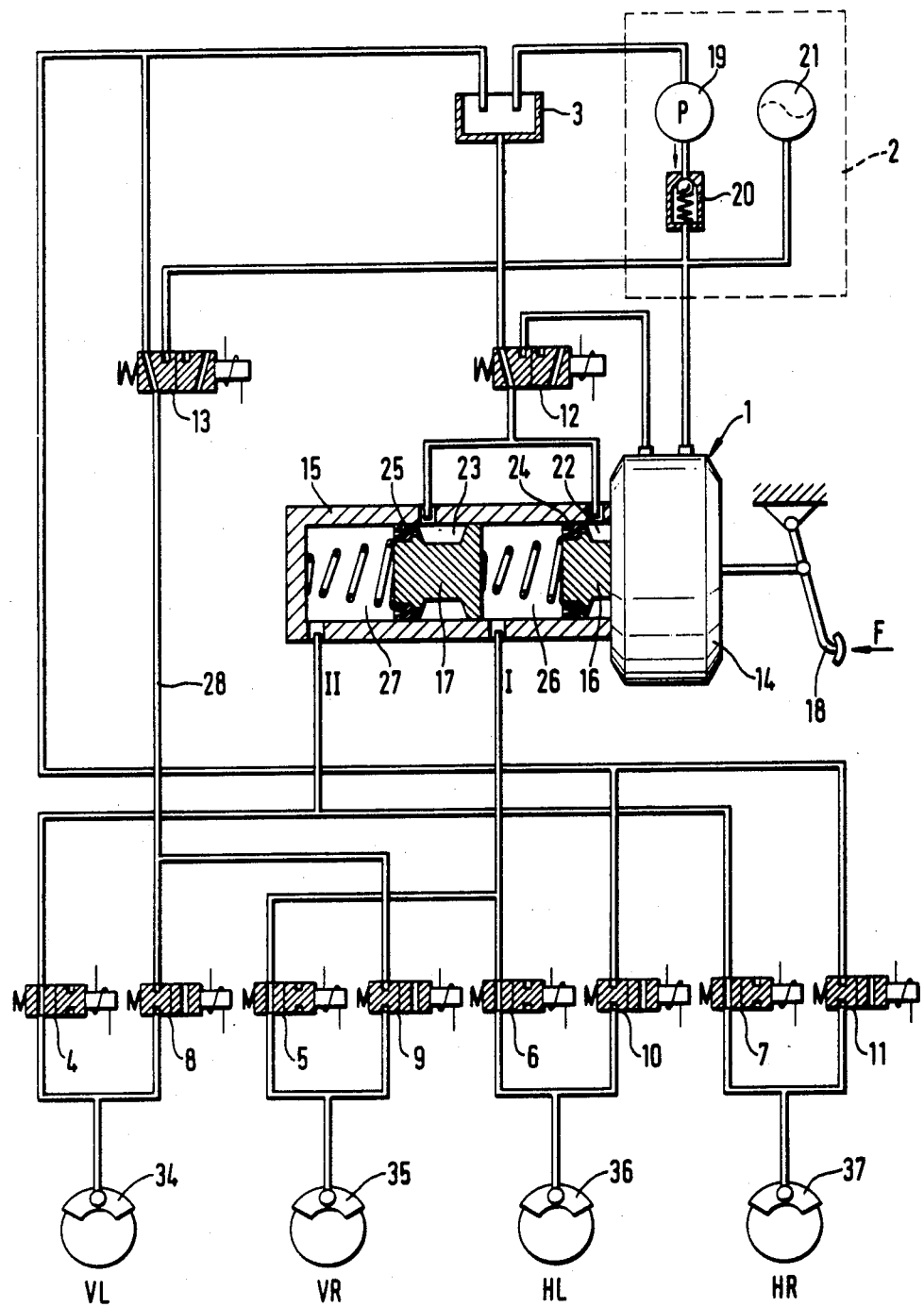
FIG. 1 is a simplified illustration of the essential component parts and the hydraulic circuitry of a slip-controlled brake system according to the invention.

Referring to FIG. 1, the brake system according to the invention comprises substantially a pedal-actuated hydraulic brake pressure generator 1, an auxiliary energy supply system 2, a pressure compensating reservoir 3 and several electromagnetically actuatable multiple-way valves 8 to 13. The front wheels VL, VR and the rear wheels HL, HR with the associated wheel brakes 34–37, ending in which are the pressure fluid conduits, are also illustrated symbolically in FIG. 1.

The brake pressure generator 1 is composed of a hydraulic brake power booster 14 and a tandem master cylinder 15, the working pistons 16 and 17 of which are acted upon by a pressure which is proportional to the pedal effort F acting on the braking pedal 18 and which is amplified by an auxiliary force. The auxiliary energy supply system 2 connected to the brake power booster 14 comprises substantially a hydraulic pump 19 with the associated non-return valve 20 and a pressure accumulator 21.

The vehicle wheels are connected diagonally to the master cylinder 15 through the intermediary of two hydraulic brake circuits I, II. The brake circuit I thus acts upon the right front wheel VR and the left rear wheel HL, the circuit II upon the left front wheel VL and the right rear wheel HR.

In order to obtain an individual control of the brake slip, a valve pair 4, 8; 5, 9; 6, 10 and 7, 11 has been assigned to each wheel, said valves being electromagnetically actuatable two-way/two-position valves, the inlet valves 4 to 7 of which are switched so as to be open in the inoperative position, whereas the outlet valves 8 to 11 normally, i.e. as long as they are not activated, interrupt the flow to the pressure compensating reservoir 3.

Through the intermediary of another valve, namely the three-way/two-position valve 12, pressure fluid from the hydraulic brake power booster is dynamically fed by way of the chambers 22, 23 in the master cylinder 15 and by way of the non-return valves 24, 25 into the working chambers 26, 27 and thus into the circuits I, II after the brake slip control has responded. When the pressure is reduced, the pressure fluid flowing back to the pressure compensating reservoir by way of the switched over outlet valves 8 to 11 is thus supplied so that even in the case of a frequent pressure reduction during a brake slip control phase, a sufficient amount of pressure fluid is left in the working chambers 26, 27, ensuring, in the event of a failure of a brake circuit, the functioning of the brake system.

In the embodiment shown, the non-return valves are installed in the sealing cups of the pistons 16, 17.

In this construction, a valve arrangement 13 for the control of the traction slip is shaped in the form of an electromagnetically actuatable three-way/two-position valve which is interposed in the pressure fluid return conduit from the wheel brakes 34, 35 of the driven wheels, which are, in the vehicle according to FIG. 1, the front wheels VL, VR, to the pressure compensating reservoir 3.

In the inoperative position, the valve 13 connects the pressure fluid return conduit 28, ending in which are the outlet valves 8 and 9 of the driven front wheels, to the pressure compensating reservoir 3. A switching-over takes only place when the measuring and control circuit (not shown) recognizes a spin of the drive wheels and, as a result thereof, generates a corresponding brake pressure control signal. After the switching-over of both valves and/or the valve pair which is associated with the spinning drive wheel or the drive wheel which has a tendency to spin (for example, the valves 4 and 8 in the case of a spinning left front wheel VL) a direct hydraulic communication between the energy supply system 2 and the corresponding front wheel (VL) has been established, through the intermediary of which brake pressure can be introduced into the wheel brake of the wheel having a tendency to spin during this phase. In this construction, the brake pressure increase can be metered very accurately (for example, by means of a cycled switching-over of the valve 8 and a variation of the cycle frequency or the pulse-duration-to-pulse-space-ratio. Since during this control phase, the inlet valve (for example, the valve 4) remains activated, the discharge of fluid pressure and a reaction on the brake pressure generator 1 are prevented.

After the deceleration of the excessive traction slip, a pressure reduction is achieved by reactivating the outlet valve 8, the three-way/two-position valve 13 in the return flow, however, being again switched back into the inoperative position in which position it establishes a communication with the pressure compensating reservoir 3.

Figure 2:
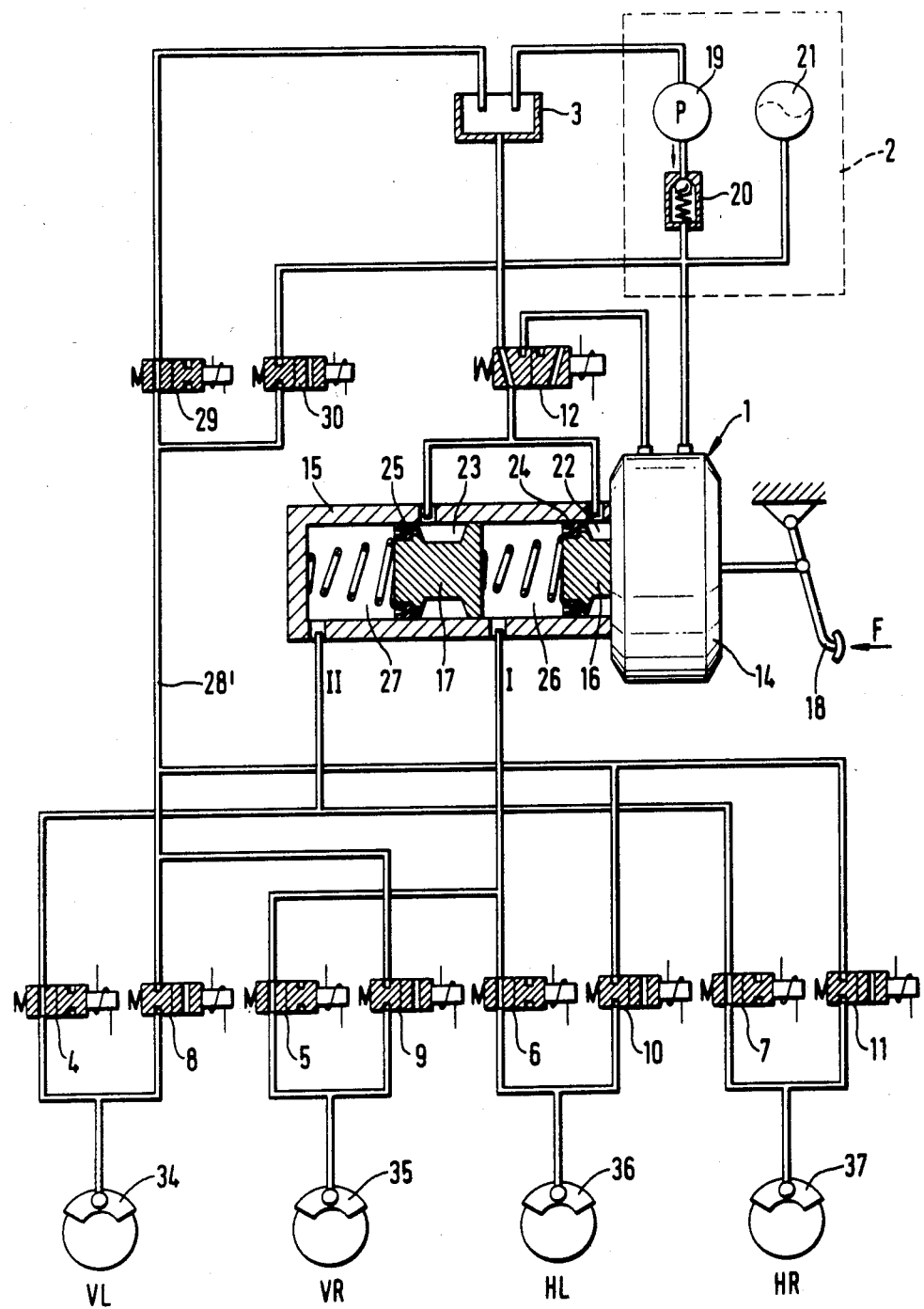
FIG. 2 is an illustration similar to that of FIG. 1 of a second embodiment of the present invention; and, FIG. 3 is an illustration of a third embodiment of the invention.

The embodiment according to FIG. 2 substantially differs from the brake system described above only with regard to the design of the valve arrangement which serves to control the traction slip. In this construction, the two-way/two-position valves 29, 30 have been interposed in the place of a three-way/two position valve, the valve 29 of which connecting the pressure fluid return conduit 28 to the pressure compensating reservoir 3 in the inoperative position. The second two-way/two-position valve 30 only establishes a direct connection between the energy supply system 2 and the return conduit 28 to which it is switched over by means of electrical excitation.

Another variant as against FIG. 1 consists, according to FIG. 2, in that the return flow by way of the outlet valves of all wheel brakes ends in the pressure fluid return conduit 28', interposed in which is the two-way/two-position arrangement of valves 29, 30. This is of no significance to the functioning of the intact system, because the pressure introduction by way of the valve 30 and the pressure fluid conduit 28' only starts after the individually controllable outlet valves of the wheels having no tendency to spin have been switched over to their inoperation positions. During the pressure reduction serving to prevent locking wheels, the valves 29, 30 are, at any rate, in the inoperative position, and the return conduit to the pressure compensating reservoir 3 is thus open.

The hydraulic circuitry according to FIG. 2 is also suitable for the traction slip control of vehicles with rear axle drive or four-wheel drive.

Figure 3:
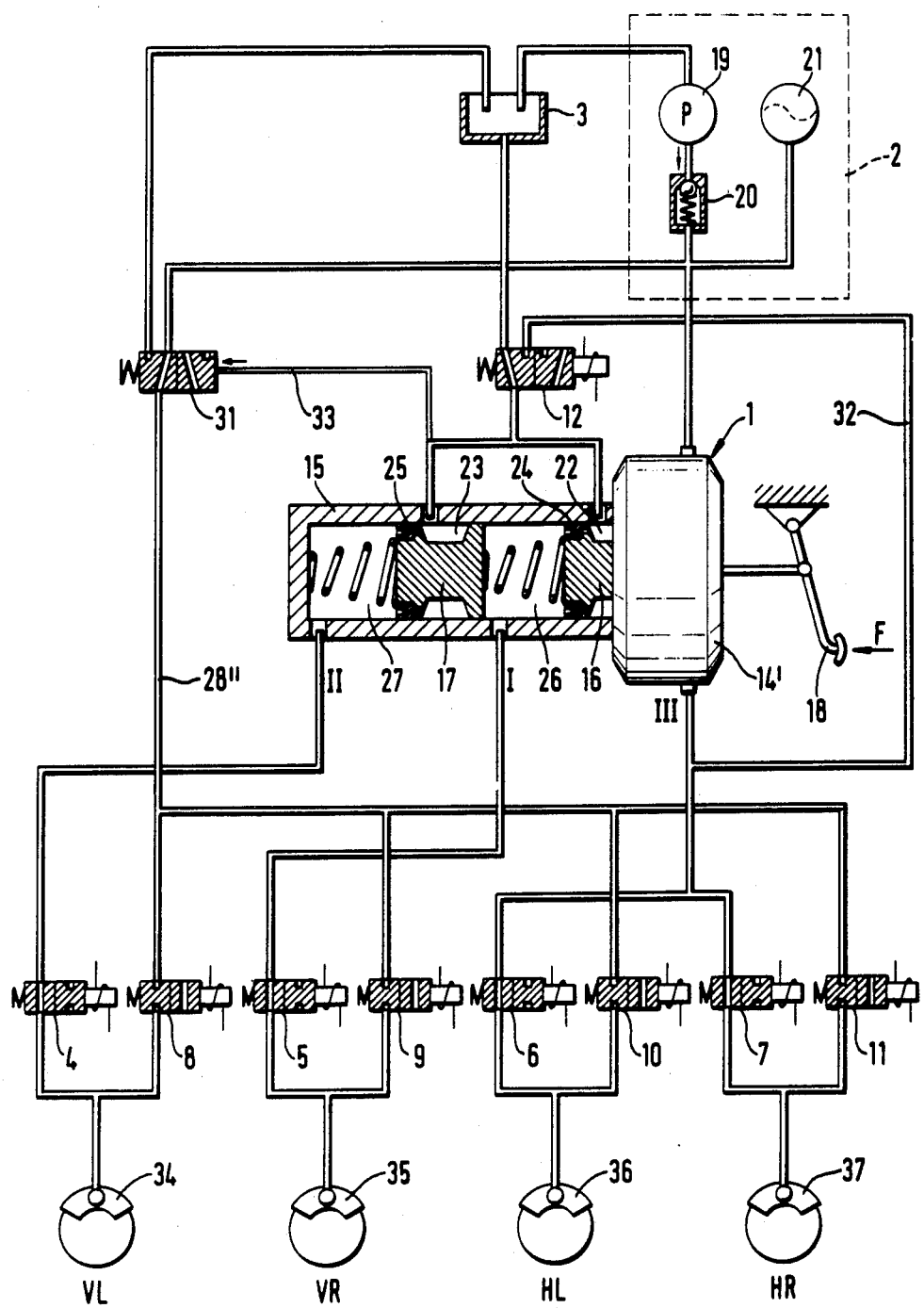

The use of identical reference numerals in FIGS. 1 and 2—and in FIG. 3 as well—indicates the conformance of the illustrated and described embodiments.

FIG. 3 shows a brake system of the type as specified in the invention comprising three hydraulic brake circuits I, II and III. In this case, one front wheel VR, VL each is connected to the two master cylinder circuits I, II whereas the pressure which is being generated in the hydraulic brake power booster 14' and which is proportional to the pedal force does not only act upon the pistons of the tandem master cylinder 15 but also directly upon the wheel brakes 36, 37 of the rear wheels HL, HR by way of the inlet valves 6, 7. This difference as against the brake systems according to FIGS. 1 and 2 is, in principle, of no significance to the mode of operation of the brake system as specified in the invention.

The valve arrangement in the direct pressure fluid conduit from the auxiliary energy supply system by way of the pressure fluid return conduit 28" to the wheel brakes 34, 35 of the driven wheels and/or the associated outlet valves 8, 9 is shaped, according to FIG. 3, in the form of a particularly simple hydraulically actuated three-way/two-position valve 31. In this system, in cntra-distinction to the embodiments according to FIG. 1 and 2, the pressure fluid return conduit 28" is permanently connected to the auxiliary energy supply system 2 when the valve 31 is in the inoperative position, said valve being only switched into its working position, in which it connects the pressure fluid return conduit 28" to the pressure compensating reservoir 3, after the brake slip control has set in. Namely, on responding of the brake slip control, the valve 12 which controls the dynamic flow-in pressure from the brake power booster circuit III by way of the conduit 32 into the tandem master cylinder 15 and by way of the latter into the hydraulic circuits I and II, is switched over, as a result whereof the pressure at the outlet of the valve 12 is increase. This pressure increase leads through the intermediary of the control conduit 33 to the switching over of the valve 31.

Only upon completion of the brake slip control and switching back of the valve 12 will the conduit 33 be reconnected to the pressure compensating reservoir 3 and, as a result thereof, the valve 31 be switched back into the inoperative position.

The mode of operation of the system according to FIG. 2 is identical to that of the systems described already. In the place of the hydraulically controlled three-way/two-position valve 31, again two hydraulically controlled two-way/two-position valves could be used.

What is claimed is:

1. A traction slip-and brake slip-controlled brake system for motor vehicles having vehicle wheels with wheel brakes, said system comprising, in combination:

a pedal-actuated hydraulic pressure generator including a hydraulic brake power booster and a tandem master cylinder having first and second pressure chambers;

a first pressure fluid conduit connecting said first chamber to a selected pair of said wheel brakes and a second pressure fluid conduit connecting said second chamber to a second selected pair of said wheel brakes;

a pressure compensating reservoir;

an auxiliary energy supply system including a hydraulic pump having an input connected to said reservoir and an output connected to said power booster and said supply system further including a pressure accumulator connected to said output of said pump;

first and second normally open control valves respectively connected in the pressure fluid conduits between said chambers and said wheel brakes;

first and second normally closed control valves respectively connected between said selected pairs of said wheel brakes and said reservoir;

a first normally open traction slip control valve connected between said normally closed valves and said reservoir;

a first normally closed traction slip control valve connected between said pressure accumulator and the normally closed valves connected to said wheel brakes wherein said master cylinder includes first and second working pistons respectively provided in said first and second chambers and each piston including an annular chamber connected as an input to a three-way/two-position valve and said three-way/two-position valve having a first output connected to said reservoir and a second output connected to said power booster.

2. The system according to claim 1, wherein each piston includes a one-way non-return valve connected between it annular chamber and the respective one of said first and second pressure chambers.

3. The system according to claim 2, wherein the normally closed valves connected to said wheel brakes are hydraulically connected to said reservoir during brake slip control and which are connected to said auxiliary energy supply system during traction slip control.

* * * * *